United States Patent
Daniel-Ivad et al.

[11] Patent Number: 6,099,987
[45] Date of Patent: Aug. 8, 2000

[54] CYLINDRICAL ELECTROCHEMICAL CELL WITH CUP SEAL FOR SEPARATOR

[75] Inventors: Josef Daniel-Ivad; Elfriede Daniel-Ivad, both of Newmarket; R. James Book, Mississauga, all of Canada

[73] Assignee: Battery Technologies Inc., Ontario, Canada

[21] Appl. No.: 09/122,316

[22] Filed: Jul. 24, 1998

[51] Int. Cl.[7] ........................................ H01M 2/18
[52] U.S. Cl. .................. 429/141; 429/133; 429/129; 429/131; 429/140; 429/142; 429/145; 429/164
[58] Field of Search ..................... 429/141, 174, 429/206, 224, 229, 129, 131, 140, 142, 144, 145, 164, 165, 185, 94, 133

[56] References Cited

U.S. PATENT DOCUMENTS

| | | | |
|---|---|---|---|
| 5,272,020 | 12/1993 | Flack | 429/141 |
| 5,300,371 | 4/1994 | Tomantschger et al. | 429/60 |
| 5,424,145 | 6/1995 | Tomantschger et al. | 429/57 |
| 5,462,819 | 10/1995 | Jacus et al. | 429/174 |
| 5,789,102 | 8/1998 | Jacus et al. | 429/141 |

FOREIGN PATENT DOCUMENTS

| | | |
|---|---|---|
| 0140021 | 5/1985 | European Pat. Off. . |
| 0413297 | 2/1991 | European Pat. Off. . |
| 669479 | 3/1987 | Switzerland ................ H01M 10/28 |
| WO09424718 | 10/1994 | WIPO . |

OTHER PUBLICATIONS

Derwent Abstract of CH 669 479 of Mar. 15, 1987.

*Primary Examiner*—Maria Nuzzolillo
*Assistant Examiner*—Angela J. Martin
*Attorney, Agent, or Firm*—Ladas & Parry

[57] ABSTRACT

A cylindrical electrochemical cell includes a cathode, an anode, a cylindrical separator, coaxial with the cell, for electrically separating the cathode and anode, and a cup seal at an end of the separator for electrically separating the anode and cathode and maintaining an ionic connection therebetween. The cup seal is comprised of one or more first layers of a micro-porous or a non-porous membrane, or a combination thereof, and one or more second layers of a porous membrane and wherein the seal overlaps at least a portion of the separator.

17 Claims, 3 Drawing Sheets

CYLINDRICAL ELECTROCHEMICAL CELL WITH CUP SEAL FOR SEPARATOR

FIELD OF THE INVENTION

The invention relates to a cup seal for one end of the separator in a cylindrical electrochemical cell. Such cells comprise a cylindrical cathode having a cylindrical cavity coaxial therewith, a cylindrical anode arranged in the cylindrical cavity, a separator between the anode and the cathode and an alkaline electrolyte. The invention is particularly suited for cylindrical manganese dioxide-zinc rechargeable cells.

BACKGROUND OF THE INVENTION

In the operation of an electrochemical cell, it is critical that the anode and the cathode, both soaked by an electrolyte, be electrically isolated from each other so as to prevent shorting. This task is performed by a separator system which ensures good electrical insulation, while maintaining the desired ionic connection between the two electrodes. In the case of rechargeable cells, having a zinc anode and manganese dioxide cathode, the separator must also be capable of preventing the penetration of zinc dendrites or other such deposits which would also lead to shorting between anode and cathode. This problem occurs especially during the charging phase. The separator is formed from a sheet of the desired material which is rolled into a cylinder and inserted into the cell during manufacture.

While much research work has been done concerning the choice of an optimum separator system, less has been done on the problems relating to the sealing of the bottom edge of the separator to prevent shorting around the bottom of the separator, and the solutions so far have been less than ideal. This problem arises due to the above mentioned method of manufacturing a cell since the separator, in the cylindrical form, is open at both ends. The top of the separator, the end near the negative terminal of the cell, is sealed by a closure as is known in the art. The sealing of the bottom of the separator (i.e. proximate the positive terminal of the cell) is achieved in many cases by the use of hot-melts or sealants as discussed below.

In cylindrical cells in which the electrodes are arranged coaxially around each other, the separator takes a thin cylindrical form and is located between the anode and cathode. Such a cylinder, however, does not provide the desired separation and the bottom of the cell. Various solutions have been proposed to address this problem; however, most of these solutions have been found to have deficiencies. In one example, the separator is formed as an upright cylinder with a closed bottom. However, since the separator is generally made of a multi-layer sheet material, the required folding of the bottom of the cylinder results in wrinkling of the sheet and, therefore, weaknesses in the bottom which usually result in shorting problems.

Another solution is proposed in Swiss Pat. No. 669,479 in which a multi-layer separator material was used, and wherein a hot-melt material served to seal the bottom. In one embodiment of the invention, a sealant was applied over the bottom folded portion of the separator. In another embodiment, the lower edges of the cylindrical separator were folded back and a plastic disc with a stepped diameter was attached over the folded lower rim of the separator and a hot-melt was applied between the stepped portion of the disc and the interior of the separator cylinder. However, this method involves a complex manufacturing process and, in the result, a higher manufacturing cost.

U.S. Pat. No. 5,272,020 discloses a separator bottom seal where the separator extends to the bottom of the cell and where a hot-melt bead is applied as a seal.

U.S. Pat. No. 5,462,819 discloses a cell wherein a separator is placed into the cell, a hot-melt material is metered into the cell so that the hot melt material flows under the bottom edge of the separator which is then pushed down and seated in the hot-melt material as it cools. This results in a barrier formed at the bottom of the cell and on both sides of the separator.

In battery systems, increasing power and energy per unit volume and mass provide benefits. In rechargeable alkaline manganese dioxide-zinc cells intended for applications presently served by commercial primary (or non-rechargeable) cells, international standards specify maximum dimensions for the standard sizes. Manufacturers, therefore, strive for maximum performance within the limitations of the maximum dimensions. Minimizing the volume occupied by inert materials such as sealing components and hot-melts and maximizing the volume used for active materials, i.e. cathode, anode and electrolyte materials, results in increased performance. In rechargeable alkaline manganese dioxide-zinc cells, another constraint on cell volume relates to the requirement for sufficient void space to minimize any pressure build up resulting from gassing (i.e. the formation of hydrogen gas) during cycles of discharge and recharge.

Therefore, as can be seen, all of the patents mentioned above involve the use of a hot-melt adhesive or other sealant material that occupies space, which could otherwise be used for active materials and/or void space.

Further, when a hot-melt adhesive or other sealant is used to seal the bottom of the separator, such region is rendered impermeable to ions and, therefore, such region does not allow for any ionic connection between the anode and cathode. This results in reduced power capability of the cell and reduced efficiency at higher rates of discharge. When the cup and/or cups at the bottom of the separator are made of the same ion permeable material as the separator, more surface area is available and improved efficiency and performance is obtained at higher discharge rates even though the absorbent non-woven fibrous layers of the material are compressed.

The reduction or elimination of the hot-melt or other sealant provides a further benefit for commercial high speed production of cells in that electrolyte dispensed into the cathode/separator sub-assembly is absorbed more quickly, allowing faster machine speeds and/or less investment in inventory tables to provide sufficient delay time for electrolyte absorption.

U.S. Pat. No. 5,424,145 teaches a cell in which an improvement to the bottom seal is provided. In this reference, a cup is provided on the bottom of the cell which overlies the separator. The cup of this reference is comprised of one layer of polyethylene.

The present invention seeks to provide a cylindrical manganese dioxide-zinc cell with improved sealing of the bottom of the separator which provides more space for active materials and/or void space.

SUMMARY OF THE INVENTION

Thus, in one embodiment, the invention provides a separator seal for a cylindrical electrochemical cell having a coaxial, cylindrical separator for separating the anode and cathode, the seal being located proximate the positive terminal of the cell, adjacent an end of the separator, for electrically separating the anode and cathode while allowing ionic connection therebetween, wherein the seal is comprised of one or more first layers of a micro-porous or a non-porous membrane, or a combination thereof, and one or more second layers of a porous membrane and wherein the seal overlaps at least a portion of the separator.

A cylindrical electrochemical cell having an anode, a cathode and a cylindrical separator, coaxial with the cell, for electrically separating the anode and cathode, the cell further including a cup positioned proximate the positive terminal of the cell, the cup forming a seal for an end of the separator, wherein the cup is comprised of one or more first layers of a micro-porous or a non-porous membrane, or a combination thereof, and one or more second layers of a porous membrane and wherein the cup overlaps at least a portion of the separator.

BRIEF DESCRIPTION OF THE DRAWINGS

The invention will now be described in connection with preferred embodiments thereof, in which reference will be made to the accompanying drawings in which.

DESCRIPTION OF THE PREFERRED EMBODIMENTS

Figure 1:
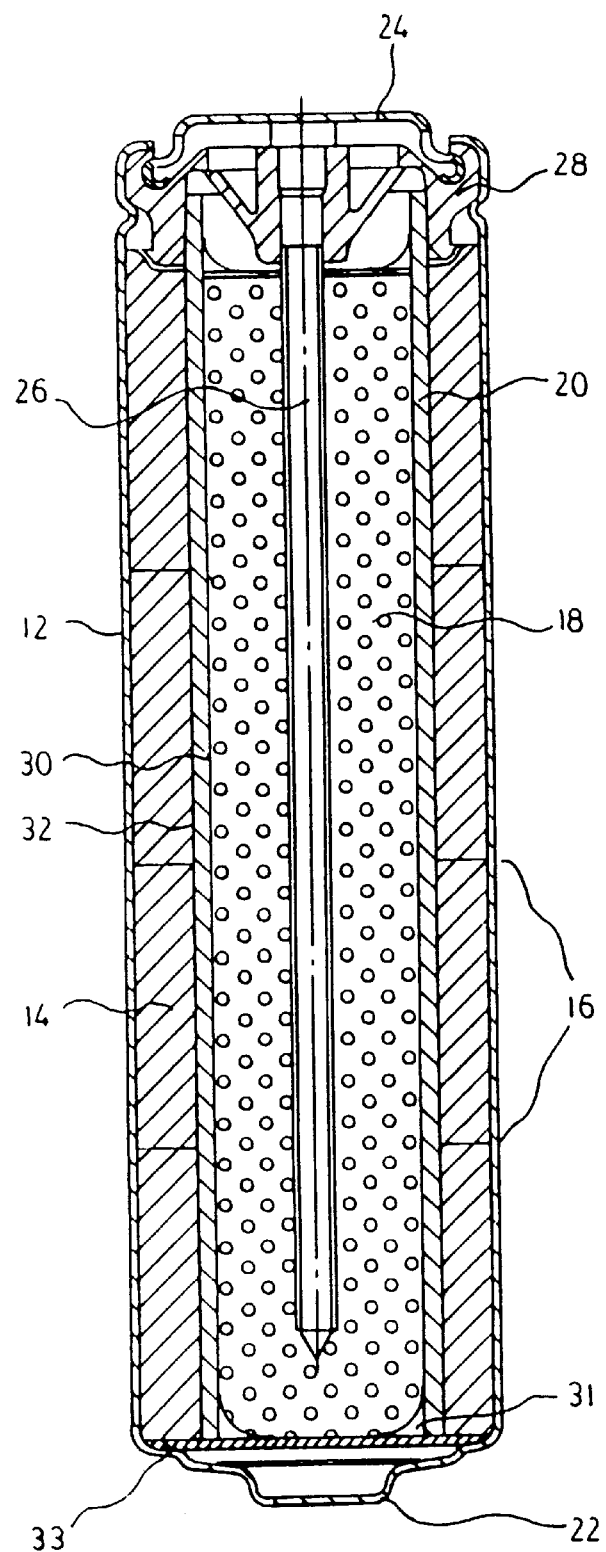
FIG. 1 is a cross-sectional elevation of a typical cylindrical cell as known in the art.

As shown in FIG. 1, a typical alkaline manganese dioxide-zinc rechargeable cell comprises the following main units: a steel can 12 defining a cylindrical inner space, a manganese dioxide cathode 14 formed by a plurality of hollow cylindrical pellets 16 pressed in the can, a zinc anode 18 made of an anode gel and arranged in the hollow interior of the cathode 14, and a cylindrical separator 20 separating the anode 18 from the cathode 14. The ionic conductivity between the anode and the cathode is provided by the presence of potassium hydroxide, KOH, electrolyte added into the cell in a predetermined quantity.

The can 12 is closed at the bottom, and it has a central circular pip 22 serving as the positive terminal. The upper end of the can 12 is hermetically sealed by a cell closure assembly which comprises a negative cap 24 formed by a thin metal sheet, a current collector nail 26 attached to the negative cap 24 and penetrating deeply into the anode gel to provide electrical contact with the anode, and a plastic top 28 electrically insulating the negative cap 24 from the can 12 and separating gas spaces formed beyond the cathode and anode structures, respectively.

The material of separator 20 consists of two different materials, i.e.: a first material 30 made of fibrous sheet material wettable by the electrolyte, and a second 32 material being impermeable to small particles but retaining ionic permeability. An expedient material for the first layer is a sheet material of non-woven polyamide fiber, which is absorbent and serves as a reservoir for electrolyte. The macro-porous structure of the absorbent layer cannot prevent internal shorting by zinc dendrites or deposits during discharge/charge cycling.

Shorting is prevented by the second 32 material which may be a layer or layers of micro-porous or non-porous material laminated to or coated onto the fibrous sheet material. One suitable material is one or more cellophane membranes laminated to the non-woven polyamide sheet. Another is one or more coatings of regenerated cellulose or viscose coated onto and partially impregnating the non-woven polyamide sheet, resulting in a composite material.

One or more layers of the laminated or composite material are wound to form a cylindrical tube and placed into the hollow cylindrical cathode structure.

As illustrated in FIG. 1, one prior art method of achieving sealing of the separator bottom is by means of a hot-melt bead 31 which was used to seal the separator 20 to a washer 33 in the cell.

Figure 2:
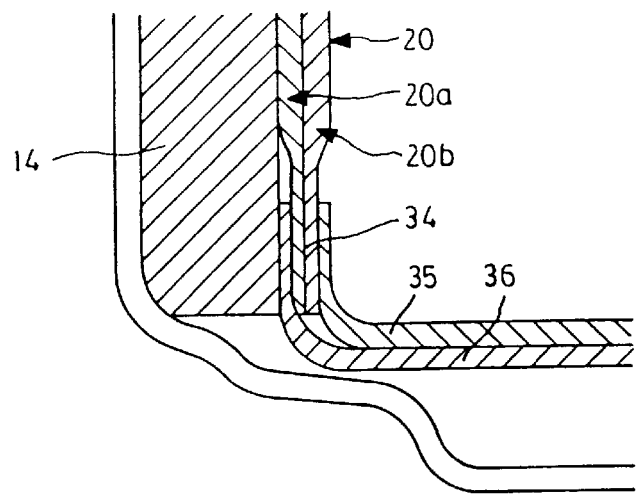
FIG. 2 is an enlarged cross-sectional view of the bottom portion of a cell according to one embodiment of the invention.
Figure 3:
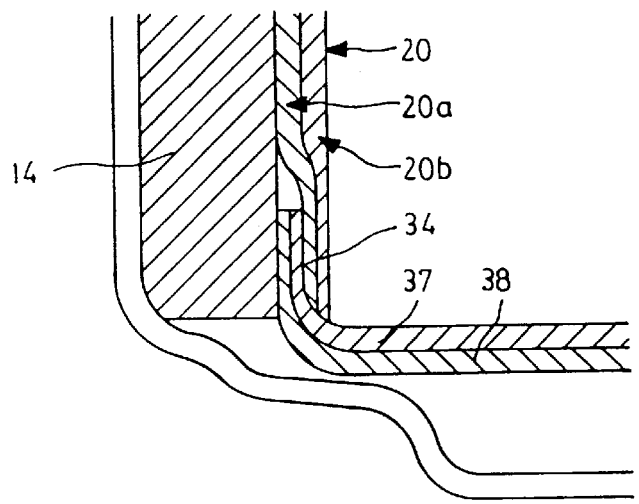
FIG. 3 is an enlarged cross-sectional view of the bottom portion of a cell according to another embodiment of the invention.
Figure 4:
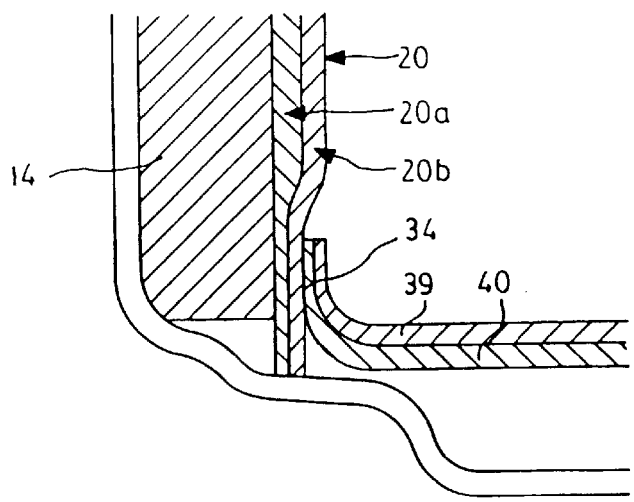
FIG. 4 is an enlarged cross-sectional view of the bottom portion of a cell according to another embodiment of the invention.

FIGS. 2 to 4 illustrate a bottom sealing means according to the present invention. As shown, the sealing of the bottom of the separator 20 is achieved in the present invention by one or more cups 35–40, placed around and/or inside the bottom of the separator. As mentioned above, the separator 20 is preferably comprised of two layers, shown as 20a and 20b. The cup or cups, 35–40, are made of a material comprising one or more thin micro-porous or non-porous membranes laminated or coated onto one or more sheets of non-woven fibrous porous material. During placement, the non-woven fibrous materials of the separator and the cup or cups are compressed in the overlap area 34 where the cup and/or cups overlap the bottom of the separator 20. Any gaps between the separator and cup or cups or formed by the wrinkling of the thin micro-porous or non-porous layers are filled by the compressed fibers of the porous non-woven layers resulting in an effective barrier to internal short circuits. This is accomplished by selection of the material in the cups, the number of cups used and the shape and dimensions of the tools used to make the placement of the cup or cups and the separator into the hollow cathode cylinder. The cup material may be moistened before placement to facilitate compression of the fibers, molding the cup into shape and minimizing wrinkling of the micro-porous or non-porous membrane.

It will be apparent that the basic advantages of a cell made according to the invention will be primarily applicable to a rechargeable, or secondary type. However the invention can equally be used in the case of primary cells as well.

The cup of the present invention serves to provide two functions. Firstly, the cup prevents internal shorts in the cell which are caused by zinc dendrites formed during the recharge phase. As mentioned above, the cup must be designed so as to prevent such dendrites from piercing through and thereby forming a connection between the anode and cathode. Secondly, the cup must also be capable of absorbing electrolyte thereby allowing wetting of the $MnO_2$ pellets of the cathode. Such criteria thereby require a specific choice of materials from which the cup can be formed. In a preferred embodiment of the invention, the cup is formed from two layers as indicated above. The material for the cup may be a laminate or a composite or a combination (i.e. a laminate layer and a composite layer). Further, the cup must not delaminate upon absorption of the electrolyte.

Since the separator and cup are not joined together, the cup also serves to increase the path of travel for the zinc dendrites between the cup and separator thereby preventing shorting of the cell. In this regard, FIG. 2 illustrates an embodiment of the invention where one cup 35 is placed inside the bottom of the separator and another cup 36 is placed outside the separator. In this manner, any zinc dendrites are forced to travel a long and circuitous route around the separator end. Although this arrangement is preferred from a functional perspective by maximizing the travel path for zinc dendrites, it also involves a complicated manufacturing process and, therefore, increased costs.

FIG. 3 shows another embodiment of the invention where two cups 37 and 38 are placed around the outside of the bottom of the separator. This embodiment is the most efficient with regard to manufacture and still provides adequate prevention of zinc dendrite penetration.

FIG. 4 shows another embodiment of the invention where two cups 39 and 40 are placed inside of the bottom of the separator. This arrangement, although achieving the desired result, would not be preferred over the embodiments illustrated in FIGS. 2 and 3.

Figure 5:
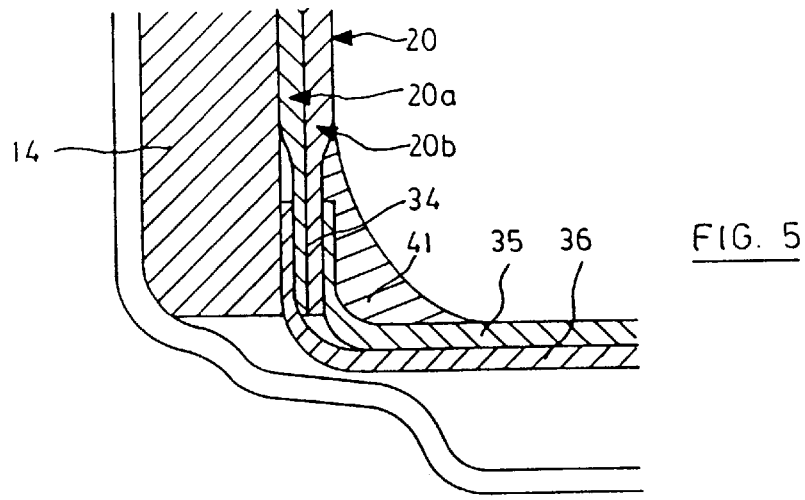
FIG. 5 is an enlarged cross-sectional view of the bottom portion of a cell according to another embodiment of the invention.
Figure 6:
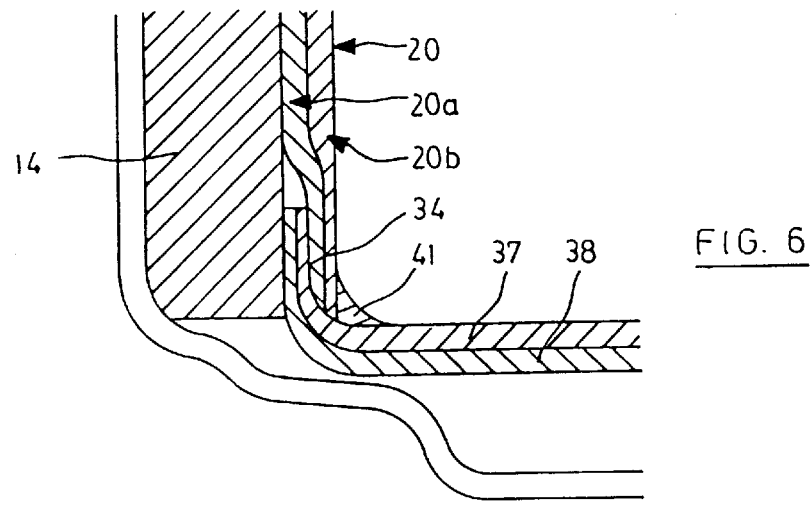
FIG. 6 is an enlarged cross-sectional view of the bottom portion of a cell according to another embodiment of the invention.
Figure 7:
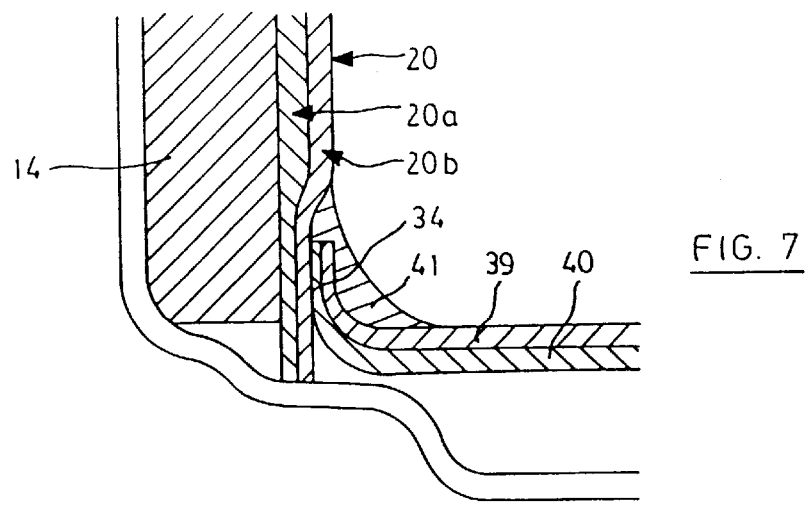
FIG. 7 is an enlarged cross-sectional view of the bottom portion of a cell according to another embodiment of the invention.

As mentioned above, it is possible to further utilize a small amount of hot-melt material to provide additional sealing for the cell. This embodiment is illustrated in FIGS. 5 to 7. As shown in FIG. 5, another embodiment of the invention involves the use of a bead of hot-melt material 41 or other similar sealant with the cup embodiment of FIG. 2 to provide additional sealing of the overlap area 34 between the cup and the separator. In this embodiment, the hot-melt bead is applied on the interior of the cylinder formed by the separator and covers the junction between the inner cup 35 and the inner layer of the separator 20b.

FIG. 6 shows another embodiment of the invention wherein a minimum amount of hot-melt or other sealant is used with the cup design of FIG. 3. As with the embodiment of FIG. 5, the bead of sealant is applied on the interior surface of the separator and cup and over the junction between the two elements.

FIG. 7 illustrates yet another embodiment wherein a sealant is used with the cup design of FIG. 4.

In the embodiments illustrated in FIGS. 5 to 7, the hot-melt bead can be replaced with a viscous sealant which is capable of soaking into the cup material and bonding to same. The advantage with this design would be that the solvent of the sealant would evaporate thereby reducing the volume occupied by the bead. It will be appreciated that any such solvent must be capable of withstanding exposure to KOH or other such electrolyte solution.

As indicated above, the cup may be made from a variety of laminated or composite materials or a combination thereof. By way of example, the material for the cup may be as follows:

a) a composite material comprising a layer of polyamide and a layer of viscose.

b) a laminated material comprising a layer of grafted polyethylene (a micro-porous membrane) between two layers of polyamide.

c) a laminated material comprising a layer of a non-porous membrane between two layers of polyamide.

It will be appreciated that other similar materials may be chosen for the cup. For example, it is possible to use cellophane as the non-porous layer for the cup. However, cellophane would not be preferred since it would be too brittle and inflexible and, therefore, would result in wrinkling of the material when placed in the cell. Further, in order to laminate a layer cellophane, an adhesive would be required. In the usual case, such adhesive would dissolve upon exposure to the KOH electrolyte thereby resulting in de-lamination of the cup material and a possibility of dendrite penetration. Other materials for the non-woven porous membrane can be made from polyvinyl alcohol, rayon, cellulosic fibers and the like. It is not necessary for the cup(s) to be made of the same material as the separator in any given cell. Further, the arrangement of the respective layers of the cup do not necessarily have to correspond with that of the separator. However, some harmonization of function may be realized if the cup and separator were arranged in the same manner.

The preferred embodiments of the invention will now be illustrated by means of examples which are not to be considered as exhaustive or restrictive of the scope of the invention.

EXAMPLE 1

Experimental rechargeable AA size alkaline manganese dioxide-zinc cells were made using 0.21 ml of hot-melt adhesive to seal the bottom of the separator. Comparable experimental cells were made using one cup around the outside of the bottom of the separator tube and one cup inside the bottom of the separator tube and no hot-melt adhesive. Such a cup design is illustrated in FIG. 2. The separator was made with two layers in which each layer was a laminate of cellophane and non-woven polyamide. The cups were made from a composite material which was viscose coated onto non-woven polyamide. The diameter of the discs from which the cups were formed was the same as the inside diameter of the can, so that when placed inside the cathode and separator an area of overlap was achieved. The separator and cups were so placed that the porous fibrous layers of non-woven polyamide were compressed to fill any gaps or wrinkles in the micro-porous cellophane and viscose layers. The true volume of the cups was 0.05 ml, saving space of 0. 16 ml, a 76% reduction in the volume of bottom seal material, representing 2.7% of cell internal volume The space saved was used to increase the amounts of electrolyte and anode used in making the cells, while the void space allowed for cell gassing remained the same. Two sets of test cells were cycle performance tested by continuously discharging the cells on load resistors to end voltages as shown in Table 1, followed by a 12 hour recharge to 1.65 Volts, over 25 cycles.

EXAMPLE 2

Experimental rechargeable AA size alkaline manganese dioxide-zinc cells of slightly different design than those in Example 1 were made. The cathode volume and ratio of anode to cathode were changed. They were made using 0.21 ml of hot-melt adhesive to seal the bottom of the separator. Comparable experimental cells were made using one cup around the outside of the bottom of the separator tube and one cup inside the bottom of the separator tube as in Example 1. The space saved was again used as in Example 1 to increase the amounts of electrolyte and anode used in making the cells, and the void space allowed for cell gassing remained the same. The two sets of cells were tested as in Example 1.

In Table 1 "cycle 1" refers to capacity on first discharge and 'cycle 25 cumulative" refers to the total delivered discharge capacity over the 25 discharge cycles by addition of the individual capacities from such cycles. The % increased performance on various tests is shown For Examples 1 and 2 there was an overall average performance increase on first discharge of approximately 10% and in cumulative performance over 25 cycles an increase of approximately 16%, demonstrating the performance benefit from extra active materials in the space saved by the cups compared to hot-melt. Not only was the theoretical capacity of the cells increased by the extra active materials, but the cells performed more efficiently for a higher utilization as well. To check for internal shorting, the charging capacity after discharge is compared to the preceding discharge capacity. If the charge capacity exceeds the discharge capacity by more than a few percent, then a significant degree of shorting is recorded. There was no internal cell shorting at the $25^{th}$ cycle, demonstrating the effectiveness of the cups at the separator bottom. In Example 2 it was noted during assembly that after a 15 minute delay, there was 70% less unabsorbed electrolyte in the cells with cups than in the cells with hot-melt adhesive, demonstrating the benefit available for high speed production.

EXAMPLE 3

Experimental rechargeable AA size alkaline manganese dioxide-zinc cells of slightly different design than those in Example 1 were made. The graphite content of the cathode was reduced and the inside diameter of the cathode was increased. The cells were made using 0.21 ml of hot-melt adhesive to seal the bottom of the separator. Comparable experimental cells were made using one cup around the outside of the bottom of the separator tube and one cup inside the bottom of the separator tube as in Example 1. The space saved was used to increase the amount of electrolyte used in making the cells with no increase in the anode and with the void space allowed for cell gassing remaining the same. The cells were tested as described in Example 1 using load resistors and end voltages as shown in Table 1, which also shows the increased performance on the various tests. Overall, there was an average performance increase on first discharge of 1% and in cumulative performance over 25 cycles an increase of 19%, demonstrating the performance benefit from extra active materials in the space saved by the cups compared to hot-melt. There was no internal cell shorting at the 25th cycle, demonstrating the effectiveness of the cups at the separator bottom.

EXAMPLE 4

Experimental rechargeable AA size alkaline manganese dioxide-zinc cells were made in which two cups were placed around the outside of the bottom of the separator tube. The material of the cups was a micro-porous radiation-grafted polyethylene membrane laminated between two layers of non-woven polyvinyl alcohol sheet. The fibers of the non-woven separator and cup materials were compressed between the layers of micro-porous membranes of the cups and separator. The cells were tested as described in Example 1 on resistor loads of 1.0, 2.2, 3.9, 10, and 43 ohms to end voltages of 0.8, 0.8, 0.9, 0.9 and 0.9 Volts respectively. There was no shorting at cycle 25 on any of those tests, indicating the effectiveness of the bottom seal of the separator with two cups placed around the outside of the bottom of the separator.

As mentioned previously, the above discussion focussed on the use of the present invention in rechargeable manganese dioxide-zinc cells. However, it will be appreciated that the cup seal of the invention can be used in any cylindrical cell.

Although the invention has been described with reference to certain specific embodiments, various modifications thereof will be apparent to those skilled in the art without departing from the spirit and scope of the invention as outlined in the claims appended hereto.

TABLE 1

Comparative Performance of Rechargeable AA Cells with Cup vs. Hot-Melt Seal.

| Load (Ohms) | Test End Voltage (Volts) | Cycle | Cell Design Change Units | EXAMPLE 1 Anode & Electrolyte Increased Performance (Increase/ Decrease) | EXAMPLE 2 Anode & Electrolyte Increased Performance (Increase/ Decrease) | EXAMPLE 3 Electrolyte Only Increased Performance (Increase/ Decrease) |
|---|---|---|---|---|---|---|
| 1.0 | 0.9 | 1 | % | +11 | +8 | +7 |
|  |  | 25 Cumulative | % | +15 | +10 | +15 |
| 1.0 | 0.8 | 1 | % | +8 | +21 | +17 |
|  |  | 25 Cumulative | % | +34 | +26 | +32 |
| 2.2 | 0.8 | 1 | % | +8 | +1 | +17 |
|  |  | 25 Cumulative | % | +12 | +17 | +16 |
| 3.9 | 0.9 | 1 | % | +8 |  | +9 |
|  |  | 25 Cumulative | % | +11 |  | +18 |
| 3.9 | 0.8 | 1 | % | +8 | +12 | +9 |
|  |  | 25 Cumulative | % | +9 | +14 | +17 |
| 10.0 | 0.9 | 1 | % | +11 |  | +7 |
|  |  | 25 Cumulative | % | +15 |  | +15 |
| Average All |  | 1 | % | +9 | +11 | +11 |
|  |  | 25 Cumulative | % | +16 | +17 | +19 |
| No. of Internal Shorts |  |  | Units | 0 | 0 | 0 |

The embodiments of the invention in which an exclusive property or privilege is claimed are defined as follows:

1. A separator seal for a cylindrical electrochemical cell having a coaxial, cylindrical separator for separating the anode and cathode, said seal being located proximate the positive terminal of said cell, adjacent an end of said separator, for electrically separating the anode and cathode while allowing ionic connection therebetween, wherein said seal is comprised of one or more first layers of a microporous or a non-porous membrane, or a combination thereof, and one or more second layers of a porous membrane and wherein said seal overlaps at least a portion of said separator.

2. The seal of claim 1 wherein said first layers provide a barrier layer to penetration from deposits generated within the cell.

3. The seal of claim 1 wherein said second layers provide a layer for absorbing electrolyte within the cell.

4. The seal of claim 1 wherein said first layers and second layers are laminated or coated together.

5. The seal of claim 4 wherein said first layers are comprised of a material chosen from viscose, grafted polyethylene, and cellophane.

6. The seal of claim 4 wherein said second layers are comprised of non-woven materials including polyamide, polyvinyl alcohol, rayon or cellulosic fibers.

7. The seal of claim 4 wherein said seal is affixed to the separator with a hot-melt or other sealant.

8. A cylindrical electrochemical cell having an anode, a cathode and a cylindrical separator, coaxial with the cell, for electrically separating said anode and cathode, the cell further including a cup positioned proximate the positive terminal of the cell, said cup forming a seal for an end of said separator, wherein said cup is comprised of one or more first layers of a micro-porous or a non-porous membrane, or a combination thereof, and one or more second layers of a porous membrane and wherein said cup overlaps at least a portion of said separator.

9. The seal of claim 8 wherein said first layers provide a barrier layer to penetration from deposits generated within the cell.

10. The seal of claim 8 wherein said second layers provide a layer for absorbing electrolyte within the cell.

11. The cell of claim 8 wherein said first layers and second layers are laminated or coated together.

12. The cell of claim 11 wherein said first layers are comprised of a material chosen from viscose, grafted polyethylene, and cellophane.

13. The cell of claim 11 wherein said second layers are comprised of non-woven materials including polyamide, polyvinyl alcohol, rayon or cellulosic fibers.

14. The cell of claim 11 wherein a plurality of said cups are provided.

15. The cell of claim 14 wherein said cups are positioned on opposite sides of the separator.

16. The cell of claim 14 wherein said cups are positioned on the same side of the separator.

17. The seal of claim 11 wherein said seal is affixed to the separator with a hot-melt or other sealant.

* * * * *